UNITED STATES PATENT OFFICE.

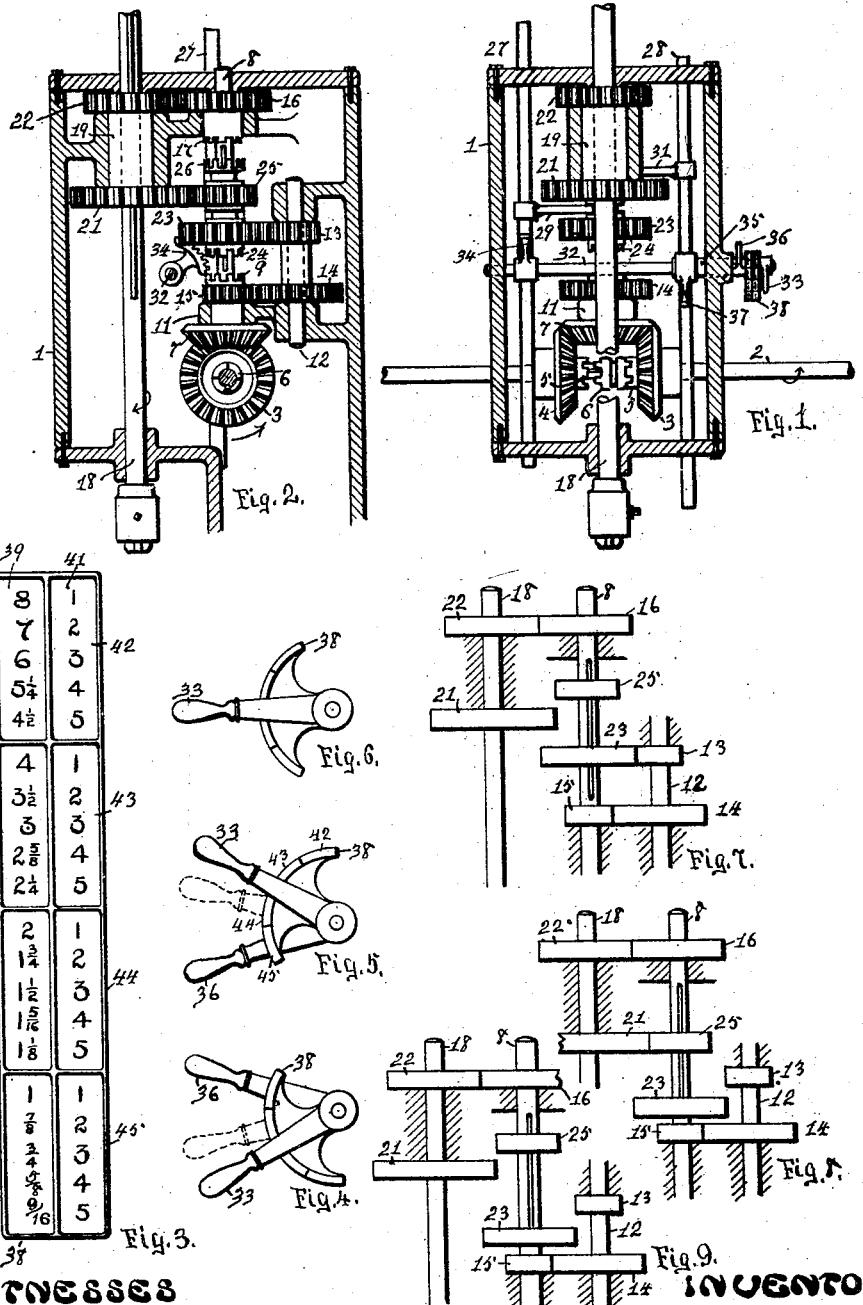

HENRY M. NORRIS, OF CINCINNATI, OHIO, ASSIGNOR TO THE CINCINNATI BICKFORD TOOL COMPANY, OF CINCINNATI, OHIO, A CORPORATION OF OHIO.

GEARING.

1,023,867.  Specification of Letters Patent.  Patented Apr. 23, 1912.

Application filed October 24, 1910. Serial No. 588,601.

*To all whom it may concern:*

Be it known that I, HENRY M. NORRIS, a citizen of the United States, residing at Cincinnati, Ohio, have invented a new and useful Improvement in Gearing, of which the following is a specification.

My invention relates to gearing and the objects of my improvements are to provide a double series of speed changing gears for the spindle; to provide a speed plate for indicating the proper cutting speed for drills of different size, and to provide simple and durable construction and assemblage of the various members for securing facility of operation and efficiency of action. These objects are attained in the following described manner as illustrated in the accompanying drawings, in which:—

Figures 1 and 2 are respectively longitudinal and transverse vertical sections through the spindle of gearing embodying my improvements; Fig. 3 the face of the speed plate; Figs. 4, 5 and 6 show the operating levers with the speed plate in different adjusted positions; and Figs. 7, 8 and 9 diagrams showing the gears in different positions of engagement for corresponding speeds.

In the drawings, 1 represents the casing adapted to be supported on the arm of a radial drill, 2 the driving shaft provided with idle driving and reversing miter gears 3 and 4 each being formed with a clutch member 5. A double clutch member 6 splined on said shaft is movable alternately into engagement with the clutch members 5 in the ordinary manner by means of a hand lever, not shown. A miter gear 7 mounted to turn on shaft 8 and formed with an extended hub which terminates in a clutch member 9 is journaled in bearing 11 in continuous engagement with gears 3 and 4. A shaft 12 journaled in fixed bearings is provided with a pinion 13 and with a gear 14 in engagement with a pinion 15 which is secured on the hub of miter gear 7. A gear 16 mounted to turn on shaft 8 is journaled in a fixed bearing and formed with a clutch member 17. The spindle 18 is splined in a sleeve 19 which is journaled in a fixed bearing and provided with a gear 21 and with a pinion 22 in engagement with gear 16. A gear 23 formed with a clutch member 24 and a pinion 25 formed with a clutch member 26 are splined on shaft 8. Shifting racks 27 and 28 are provided with forked arms 29 and 31 in engagement respectively with the hubs of the gear 23 and the pinion 25. A shaft 32 is provided with a hand lever 33 and with a segmental gear 34 in engagement with rack 27. A sleeve 35 mounted to turn on shaft 32 is provided with a hand lever 36 and with a segmental gear 37 in engagement with rack 28.

A curved speed plate 38 is carried by hand lever 33 in an arc concentric with shaft 32. Columns 39 and 41 of number characters displayed on said plate are divided into a plurality of groups as 42, 43, 44 and 45. The numbers in column 39 are for indicating the different sized drills to be used for corresponding speeds of the spindle. Column 41 consists of the same series of consecutive numbers repeated in each group for indicating the corresponding speed changes in shaft 2 which may be effected by means of the speed changing mechanism shown and described in the United States patent granted to me Nov. 5, 1901, and numbered 686,116 or by any other suitable speed changing mechanism.

In operation, the major changes of speed for the spindle corresponding to the respective groups on the speed plate may be effected by the movement of the gear 23 and the pinion 25 by means of the hand levers with the shifting connections therewith. For group 42 representing the slowest group speed the hand levers may be positioned as shown in Fig. 4 with the gear 23 and pinion 25 in engagement with the corresponding pinion 13 and gear 21 as shown in Fig. 2. In this position the spindle is driven from the miter gear 7 through pinion 15, gear 14, pinion 13, gear 23, shaft 8, pinion 25 and gear 21.

For group 43 the movement of hand lever 36 into registration with group 43 as shown by dotted lines in Fig. 4 disengages pinion 25 from gear 21 and engages the clutch members 26 and 17 whereby the spindle may be driven from the miter gear 7 through pinion 15, gear 14, pinion 13, gear 23, shaft 8, gear 16 and pinion 22 as shown in Fig. 7.

For group 44 the hand lever 33 with the speed plate may be turned in an upward position and hand lever 36 moved into registration with said group 44 as shown by dotted lines in Fig. 5. In this position the gear 23 is out of engagement with the pinion 13 and the clutch members 24 and 9 into engagement with each other, the clutch members 26 and 17 disengaged and pinion 25 reëngaged with gear 21 whereby the spindle may be driven from miter gear 7 through pinion 15, gear 23 clutched thereto, shaft 8, pinion 25 and gear 21 as shown in Fig. 8.

For group 45 with the hand levers positioned as shown in Fig. 5 the pinion 25 is out of engagement with the gear 21 and the clutch members 26 and 17 are reëngaged whereby the spindle may be driven at its highest group speed from miter gear 7 through pinion 15, gear 23 clutched thereto, shaft 8, pinion 25, gear 16 clutched thereto and gear 22 as shown in Fig. 9. Each group speed above described may be graduated into minor speed changes as indicated by the numbers in column 41 on the speed plate by means of corresponding changes in the speed of the shaft 2 with the miter gear 7. After the proper speed is selected for one of the groups as above described, the minor graduations for the size of the different drills indicated in column 39 of said group are indicated by corresponding numbers in column 41.

For disconnecting the spindle from the bevel gear 7 hand lever 33 with the speed plate may be moved into the intermediate position shown in Fig. 6 whereby gear 23 is disengaged from the corresponding pinion 13 without effecting the engagement of the clutch members 24 and 9.

Having fully described my improvements, what I claim as my invention and desire to secure by Letters Patent of the United States is:—

1. The combination of a spindle, a shaft, a driving gear, detachable change speed gear and clutch connections therefrom with the shaft, separate and detachable change speed gear and clutch connections from the shaft with the spindle, respective actuating levers with connections for said change speed gear and clutch connections, and a speed plate movable with one of said levers and adapted to indicate predetermined speeds of the spindle by the position of said other lever in relation thereto.

2. In a gearing, the combination of a spindle, a driving gear, a shaft journaled therein, detachable change speed gear connections therefrom, with the gear, and also detachable change speed gear connections from the shaft with the spindle, and a speed plate constructed and arranged for automatically indicating the different speeds of the spindle corresponding to the position of said connections.

3. In a gearing, a spindle, a driving gear, a plural number of detachable change speed gear connections between them, and a speed plate for separately and automatically indicating predetermined speeds of the spindle corresponding with different positions of the respective said connections.

H. M. NORRIS.

Witnesses:
MATT J. DAY,
R. S. CARR.